Figure 1:
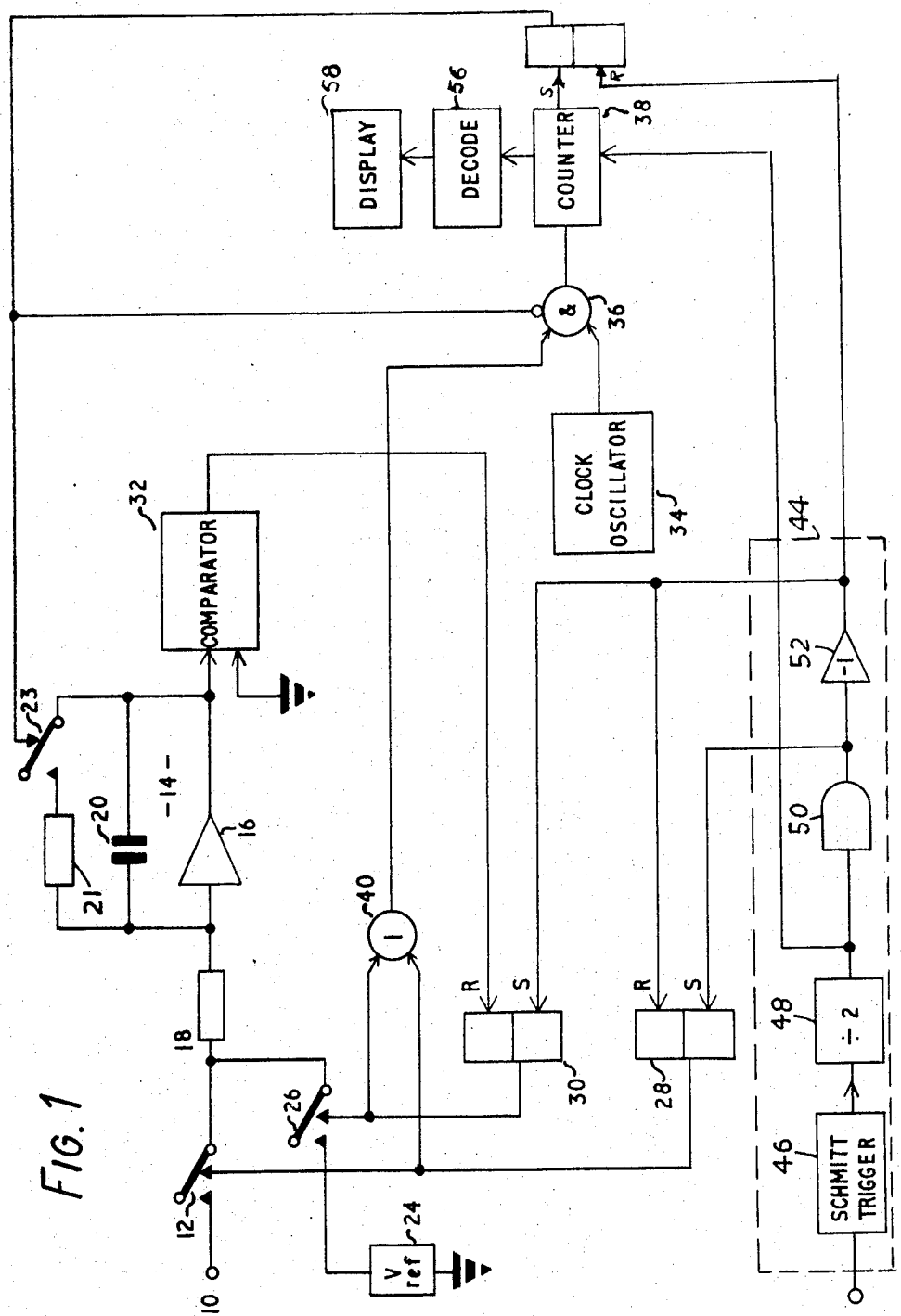

United States Patent [19]
Dorey

[11] 3,729,733
[45] Apr. 24, 1973

[54] ANALOGUE TO DIGITAL CONVERTERS

[75] Inventor: Howard Anthony Dorey, Godalming, Surrey, England

[73] Assignee: The Solatron Electronic Group Limited, Farnborough, Hampshire, England

[22] Filed: Nov. 23, 1971

[21] Appl. No.: 201,553

[30] Foreign Application Priority Data

Nov. 24, 1970 Great Britain.....................55,817/70

[52] U.S. Cl......340/347 NT, 340/347 AD, 324/99 D
[51] Int. Cl............................................H03k 13/20
[58] Field of Search................340/347 NT, 347 AD; 324/99 D; 235/183

[56] References Cited

UNITED STATES PATENTS

| | | | |
|---|---|---|---|
| 3,439,271 | 4/1969 | Metcalf et al. | 340/347 NT |
| 3,566,265 | 2/1971 | Reid | 340/347 NT |
| 3,569,957 | 3/1971 | Masterson | 340/347 NT |

FOREIGN PATENTS OR APPLICATIONS 1,153,201   5/1969   Great Britain.................340/347 NT

*Primary Examiner*—Charles D. Miller
*Attorney*—William R. Sherman et al.

[57] ABSTRACT

In an integrating analogue-to-digital converter, particularly a digital voltmeter, the input voltage is applied to an integrator for a sampling period equal to one period of the local line frequency (e.g., 50 Hz or 60 Hz). The integrator has a transfer function of the form $1/pT$ for a fixed period S just less than the minimum possible duration of the sampling period, and of the form $1/(1+pT)$ for the remainder dS of the sampling period. Thus D.C. voltages are integrated for a known fixed period, while normal mode interference at the local line frequency is integrated out.

7 Claims, 2 Drawing Figures

ANALOGUE TO DIGITAL CONVERTERS

The present invention relates to integrating analogue to digital converters of the kind wherein, in each conversion period, an input electrical signal to be converted is applied to an integrating means during a sampling interval to tend to cause the output of the integrating means to ramp away from a datum level, and a reference signal is applied to the integrating means during a digitizing interval in such a manner as to restore the output of the integrating means to the datum level, the ratio of the lengths of the digitizing interval to the sampling interval being dependent upon the mean magnitude of the input signal during the sampling interval. Typically, clock pulses are counted during the digitizing interval to provide a digital measure of the input signal. The reference signal may be substituted for, or superimposed on, the input signal, and the digitizing interval can follow, or occur during, the sampling interval. Such converters will hereinafter be referred to as converters of the kind described and typical examples are disclosed in the specifications of British Patents No. 1,090,047, 869,262 and 1,220,091 (U.S. Patents No. 3,316,547, 3,051,939 and Application Ser. No. 764,490 filed Oct. 2, 1968 respectively). One use of such a converter is as a digital voltmeter.

Integrating analogue to digital converters are specially useful when converting an analogue input signal contaminated with normal (series) made interference. Most normal mode interference, which appears in series with the signal to be converted, can be attributed to line-frequency hum at 50Hz (and its harmonics) and may be reduced significantly by making the sampling interval equal to one or more line periods. Conventionally this is achieved by counting clock pulses from the start of the sampling interval and terminating the interval when the count reaches a predetermined number. For example, the combination of a 100KHz clock oscillator arranged to feed clock pulses to a counter could be used to terminate the sampling interval when the count reached 20,000, to provide an interval of 20mSecs (one period of 50Hz line frequency). By this technique a normal-mode rejection of 60dB is readily achieved for a nominal 50Hz interfering signal.

The description will, for ease of explanation, hereinafter be restricted to normal-mode interference at a line frequency of 50Hz (or its harmonics) although it will be realized that the interference can occur at, and the invention is applicable to, frequencies other than line frequency. Any small variations in the line frequency signal will result in imperfect integration (or averaging) of the signal with a consequent reduction in the normal-mode rejection of the converter. For example, a 1 change in line frequency could reduce the normal-mode rejection to about 40dB. The effects of such variations in line frequency on the normal-mode rejection may be alleviated by varying the frequency of the clock oscillator in dependence upon that of the line frequency, and one way of achieving this is disclosed in the specification of our British Pat. application No. 41428/67 (Ser. No. 1,245,578).

The present invention provides another way of alleviating the affects of small variations in a normal-mode interfering signal on the normal-mode rejection of an integrating analogue to digital converter.

According to the present invention there is provided an analogue to digital converter of the kind described wherein an analogue input electrical signal is applied to an integrating means for a sampling interval, $S + dS$, in each conversion period, and the integrating means is arranged to have a transfer function of the form $1/pT_1$ for a predetermined period S from the start of each sampling interval and a transfer function of the form $1/(1 + pT_2)$ for the remainder of the interval $dS$. T is the time constant of the integrating means and $p$ is the differential operator $d/dt$. The sampling interval, $S + dS$, is made equal to an integral number of periods, P, of the normal-mode interfering signal to be rejected. If the period P of the interfering signal is constant then dS remains constant but if P changes by $\pm dP$ then $dS$ changes by $\pm dP$.

In a preferred embodiment of the invention $T_2$ is made substantially equal to S which is defined as a number of cycles of an internal clock.

Figure 2:
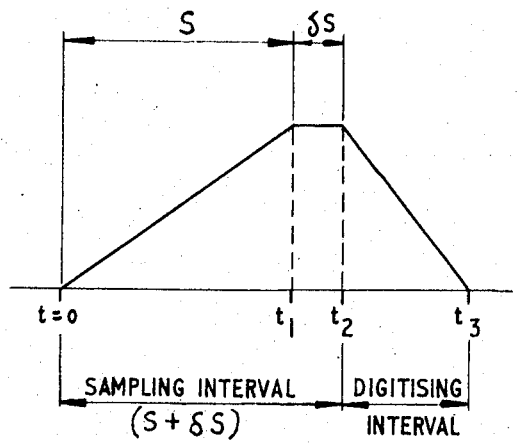

The invention will now be described by way of example with reference to the accompanying drawings, in which:

FIG. 1 is a block schematic diagram of a dual-ramp digital voltmeter embodying the invention, and FIG. 2 is a explanatory waveform showing the output level of the integrating circuit during a measurement period.

In FIG. 1 the switches are shown as mechanical switches although in practice they would probably be semi-conductor switches such as field effect transistors.

Referring to FIG. 1, the voltmeter has an input terminal 10 to which a voltage to be measured may, in operation, be applied. It is assumed that the input voltage is subjected to normal-mode interference at the 50Hz line frequency. The terminal 10 is coupled through a switch 12 to the input of an integrating circuit 14 comprising an operational amplifier 16, an input resistor 18 and a feed-back capacitor 20 connected between the input and the output of the amplifier 16. In this configuration the integrating circuit 14 has a transfer function of the form $1/pT_1$ where $T_1$ is the time constant of the resistance $R_1$ of the resistor 18 and the capacitance C of the capacitor 20. Also connected between the input and output of amplifier 16 is a series circuit comprising a resistor 21 and a normally-open switch 23. When the switch 23 is closed the circuit 14 has a transfer function of the form $1/(1 + pT_2)$, where $T_2$ is the time constant of the resistance $R_2$ of the resistor 21 and the capacitance C of the capacitor 20.

A source 24 of a reference voltage of opposite polarity to that of the input voltage is coupled through a switch 26 to the input of the circuit 14.

The switches 12 and 26 are controlled by bistable flip-flop circuits 28 and 30 respectively, each switch being closed when its respective flip-flop is set.

Connected to the output of the integrating circuit 14 is a comparator 32 which is arranged to provide a reset signal to the flip-flop 30 each time the output level of the circuit 14 returns to a datum level (in this case signal ground).

A clock oscillator 34 having a pulse output frequency of 105KHz is connected to one input of an AND gate 36 the output of which is connected to a counter 38. Connected to another input of the AND gate 36 is the output of an OR gate 40 which has respective inputs connected to the outputs of the flip-flops 28 and 30. Thus a "1" appears on the output of the OR gate 40 whenever either one of the switches 12 and 26 is closed, to open the AND gate 36 and allow clock pulses to be counted by the counter 38.

The counter 38 has a full-house count of 20,000. When the counter reaches 20,000 it provides a pulse to set the bistable flip-flop circuit 41. When in the set state the flip-flop 41 closes switch 23 and inhibits the passage of clock pulses through the AND gate 36.

The operation of the digital voltmeter is controlled by a timing control circuit, shown within the broken line 44. The circuit 44 comprises a Schmidt trigger 46 coupled to receive a signal at the 50Hz line frequency and provide a 50Hz square wave to a divide by two circuit 48, which provides at its output a 25Hz square wave (that is 20mSecs control pulses). The control pulses are used to control the operation of the voltmeter. It will be realized that the line frequency has only a nominal value of 50Hz and will be subject to slight variations in frequency about this nominal value.

It will be assumed that positive-going edges are used to set and reset the flip-flops.

A positive-going edge of a control pulse from the circuit 48 is applied to reset to zero the counter 38 and after a suitable delay provided by a delay circuit 50 the flip-flop 28 is set to close the switch 12 and open AND gate 36 by way of the OR gate 40.

When switch 12 closes (at time $t_o$, FIG. 2) the input voltage is applied to the integrating circuit 14 and the output level of the integrator ramps away from a datum level, which is in this case signal ground. 105KHz clock pulses are counted by counter 38 until the count reaches a full house of 20,000 when the flip-flop 40 is set to inhibit AND gate 36 thereby preventing the further passage of clock pulses, and close the switch 23 to change the transfer function of the circuit 14 to the form $1/(1 + pT_2)$, where $T_2$ is the time constant of the resistance $R_2$ of resistor 21 and the capacitance C of capacitor 20. This occurs after about 19mSecs (time $t_1$) which is assumed to be less than the minimum period of one cycle of the line frequency.

The switch 12 remains closed until the end of the control pulse (approximately 20mSecs) when the negative-going edge of the pulse is inverted by an inverter 52 and applied to reset the flip-flop 28 and thereby open switch 12 at time $t_2$.

Thus the sampling interval $S + dS$ during which the input voltage is applied to circuit 14 is made equal to one period of the line frequency which may vary, but the interval $S(t_o$ to $t_1)$ when the circuit 14 has a transfer function $1/pT_1$ is maintained constant. The interval $dS$ between time $t_1$ to $t_2$ varies with variations in line frequency.

The positive-going output of inverter 52 is also applied to reset the flip-flop 41 which removes the inhibit signal from AND gate 36 and opens switch 23 causing the transfer function of the circuit 14 to revert to the form $1/pT_1$, and to set the flip-flop 30 thereby closing switch 26 to apply the reference voltage to the integrating circuit 14. The output of the circuit 14 ramps back towards datum level and when it reaches datum, at time $t_3$ the comparator circuit 32 causes the flip-flop 30 to reset thus opening switch 26 and closing AND gate 36. The number N of clock pulses counted by the counter 38 during the digitizing interval $t_2$ to $t_3$ is a measure of the magnitude of the input voltage applied during the period $t_o$ to $t_1$. At the end of the digitizing interval the number of clock pulses in the counter 38 is decoded in a decoder 56 and displayed on a display 58.

Considering a steady d.c. input voltage $V_1$. After the period $t = 0$ to $t_1$, that is S, the output level $$V_o = (V_1/R_1) \cdot (S/C) \qquad (1)$$

Between $t_1$ and $t_2$ the output level $v_o$ remains substantially constant and the equation $$V_o = V_1 \cdot (R_2/R_1) \qquad (2)$$

applies.

To avoid discontinuities of the output level $V_o$, equations 1 and 2 must be equal:
$(V_1/R_1) \cdot (S/C) = V_1 \cdot (R_2/R_1)$
$S = CR_2 = T_2$ Therefore the time constant of the integrating means when it has the form $1/(1 + pT_2)$ should equal the period S.

Thus d.c. voltages are measured as if the switch 12 were closed for a fixed interval S but a.c. voltages are integrated for the period $(S + dS)$ and in the embodiment normal-mode interference will be substantially less than it would have been if it had been integrated for the interval S only. If the period P of the line voltage changes by $\pm dP$ then the d.c. input voltage will still be integrated for the same fixed period but the a.c. voltage will be integrated for the period $(S + dS \pm dP)$ ensuring good normal-mode rejection of the a.c. signal.

A.C. Voltages are measured as though they were integrated in the interval $(S + dS)$ to an accuracy of $(dS/S)^2$. Thus if S differs from $(S + dS)$ by 1 percent the resultant error is 0.01 percent.

If the voltmeter is measuring an a.c. voltage and the wave form is rectified, but not smoothed, before being applied to the integrating means this form of integration may be used to measure the mean value of a whole number of cycles of the wave form. Known voltmeters take a long settling period as a complex filter is required.

What is claimed is:

1. An analogue to digital converter for converting to digital form an analogue input signal which input signal may be subject to a normal mode interfering signal of period P, the converter comprising integrating means having an input and an output, timing means for applying the input signal to the input of the integrating means for a sampling interval $S + dS$ to cause the output level of the integrating means to deviate from a datum level, a source of a reference signal, a source of clock pulses, a pulse counter, means for applying the reference signal to the input of the integrating means in such a manner as to cause the integrating means output to return to the datum level during a digitizing interval and for simultaneously causing the pulse counter to count clock pulses, and means responsive to the return to the integrating means output level to the datum level for terminating the digitizing interval, the integrating means having first and second selectable transfer functions of the form $1/pT_1$ and $1/(1 + pT_2)$ respectively, wherein $T_1$ and $T_2$ are preselected time constants and $p$ is the differential operator $d/dt$, and control means for selectively causing the integrating means to have a transfer function of the first form during the digitizing interval and during a predetermined period $S$ from the start of each sampling interval, and a transfer function of the second form during the remaining period $dS$ of the sampling interval.

2. A converter according to claim 1, wherein the timing means includes means responsive to the interfering signal of period P for causing the sampling interval $S + dS$ to be substantially equal to an integral number N of periods P.

3. A converter according to claim 2, where N is equal to unity.

4. A converter according to claim 1, wherein the time constant $T_2$ of the second transfer function is substantially equal to the period $S$.

5. A converter according to claim 2, wherein the timing means further includes means for inhibiting the counting of clock pulses during the period $dS$.

6. A converter according to claim 1, wherein the integrating means includes a circuit comprising a capacitor, and a series circuit of a resistor and switch means coupled in parallel with the capacitor, the switch means having first and second operative states wherein it is substantially open-circuit and substantially short-circuit respectively, the control means being operably coupled to the switch means for causing the integrating means to have transfer functions of the first and second forms when the switch means is in one and the other of its operative states respectively.

7. A converter according to claim 6, wherein the control means includes means for causing clock pulses to be counted by the counter during the sampling interval and means coupled to the counter to operate the switch means and thereby cause the integrating means to have a transfer function of the second form when the count reaches a predetermined value representative of the period $S$.

\* \* \* \* \*